(12) United States Patent
El-Gayyar

(10) Patent No.: US 9,922,788 B2
(45) Date of Patent: Mar. 20, 2018

(54) ELECTRICAL DEVICE WITH ASSOCIATED SETTINGS AND SYSTEM INCLUDING THE SAME

(71) Applicant: EATON CORPORATION, Cleveland, OH (US)

(72) Inventor: Ahmed El-Gayyar, Senoia, GA (US)

(73) Assignee: EATON CORPORATION, Cleveland, OH (US)

( * ) Notice: Subject to any disclaimer, the term of this patent is extended or adjusted under 35 U.S.C. 154(b) by 257 days.

(21) Appl. No.: 14/845,498

(22) Filed: Sep. 4, 2015

(65) Prior Publication Data

US 2017/0069449 A1   Mar. 9, 2017

(51) Int. Cl.
*H01H 47/00*   (2006.01)
*H04W 4/00*   (2018.01)

(52) U.S. Cl.
CPC .......... *H01H 47/001* (2013.01); *H04W 4/008* (2013.01)

(58) Field of Classification Search
CPC .............................. H01H 47/001; H04W 4/008
USPC ........................................... 307/116, 130, 131
See application file for complete search history.

(56) References Cited

U.S. PATENT DOCUMENTS

2006/0044152 A1   3/2006   Wang
2015/0309545 A1*  10/2015  Shuey ...................... H02J 4/00
                                                                    307/130

* cited by examiner

*Primary Examiner* — John Poos
(74) *Attorney, Agent, or Firm* — Eckert Seamans; Nathaniel Wilks; Grant Coffield

(57) ABSTRACT

An electrical device having one or more settings associated therewith, the electrical device includes a wireless communication unit structured to wirelessly communicate with an external device and to wirelessly receive settings information from the external device, a processor structured to configure one or more settings associated with the electrical device based on the received settings information, and a function module structured to provide an additional function associated with a type of the electrical device.

14 Claims, 4 Drawing Sheets

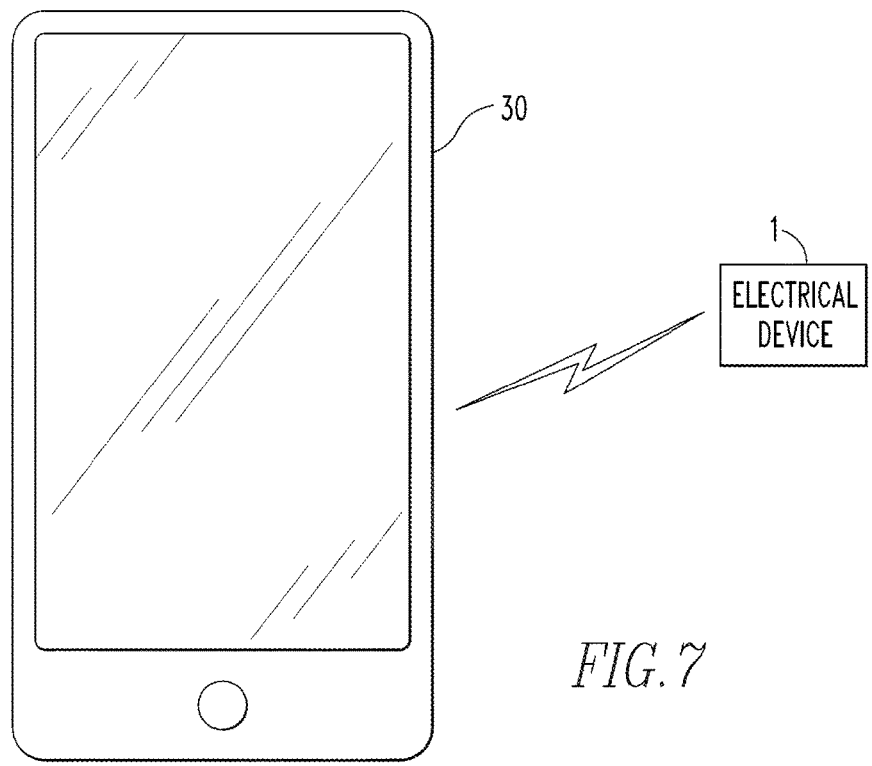
FIG. 7
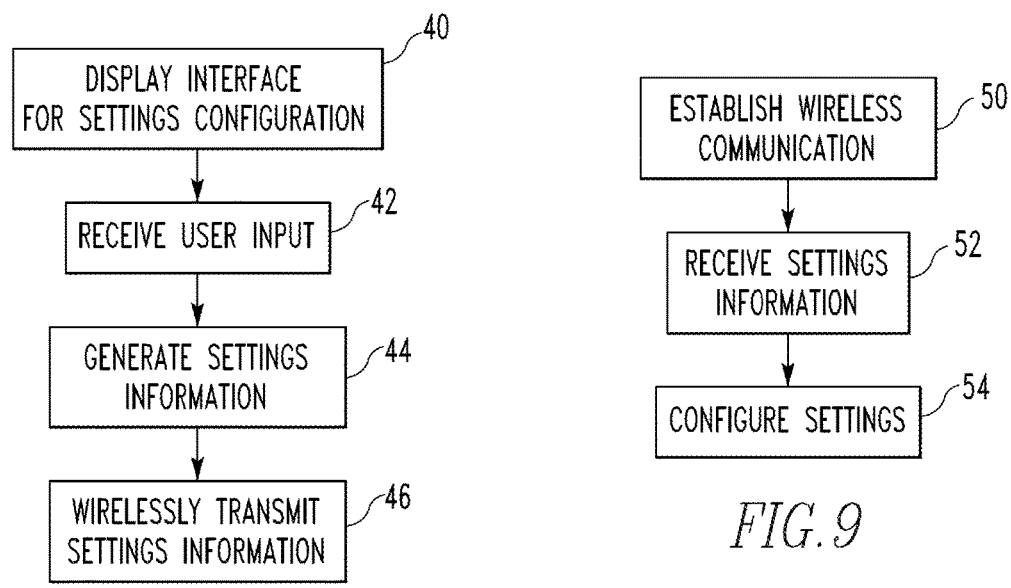
FIG. 8
FIG. 9

ELECTRICAL DEVICE WITH ASSOCIATED SETTINGS AND SYSTEM INCLUDING THE SAME

CROSS-REFERENCE TO RELATED APPLICATION

This application is related to co-pending U.S. patent application Ser. No. 14/845,441 filed on Aug. 4, 2015, entitled "ELECTRICAL DEVICE, NETWORK AND METHOD OF CONTROLLING THE SAME", the entirety of which is incorporated herein by reference.

BACKGROUND

Field

The disclosed concept relates generally to electrical devices, and more particularly, to electrical devices having associated settings. The disclosed concept also relates to systems including electrical devices with associated settings.

Background Information

Electrical devices can be simple, like a basic light switch that allows a user to simply turn on or turn off a light. The basic light switch includes only a switch that can be actuated to open or close a power circuit to the light. A slightly more complex variation of a basic light switch is a dimmer switch. A dimmer switch allows a user to dim the light in addition to turning it on or off. In order to provide the dimming function, dimmer switches include a rotatable knob or a sliding switch that allows a user to control the amount that the light is dimmed. Additionally, dimmer switches include a potentiometer that allows the voltage applied to the light to be changed based on the position of the rotatable knob or sliding switch.

As additional functions are applied to electrical devices, controls that allow the user to utilize those functions must also be added. The controls add to the size and cost of the electrical device. Additionally, numerous controls can cause the electrical device to become confusing to operate.

There is room for improvement in electrical devices.

There is also room for improvement in systems including electrical devices.

SUMMARY

These needs and others are met by embodiments of the disclosed concept, which are directed to an electrical device and system wherein the electrical device(s) have one or more associated settings and are configured to wirelessly receive settings information and configure such settings based on the received settings information.

An electrical device having one or more settings associated therewith comprises: a wireless communication unit structured to wirelessly communicate with an external device and to wirelessly receive settings information from the external device; a processor structured to configure one or more settings associated with the electrical device based on the received settings information; and a function module structured to provide an additional function associated with a type of the electrical device.

A system comprises: a user device structured to wirelessly transmit settings information including information for configuring one or more settings; and an electrical device including: a wireless communication unit structured to wirelessly communicate with the user device and to wirelessly receive the settings information from the external device; a processor structured to configure one or more settings associated with the electrical device based on the received settings information; and a function module structured to provide an additional function associated with a type of the electrical device.

BRIEF DESCRIPTION OF THE DRAWINGS

A full understanding of the disclosed concept can be gained from the following description of the preferred embodiments when read in conjunction with the accompanying drawings in which:

FIG. 7 is a schematic diagram of a system in accordance with an example embodiment of the disclosed concept;

FIG. 8 is a flowchart of a method of transmitting settings information in accordance with an example embodiment of the disclosed concept; and FIG. 9 is a flowchart of a method of receiving settings information in accordance with an example embodiment of the disclosed concept.

DESCRIPTION OF THE PREFERRED EMBODIMENTS

Figure 1:
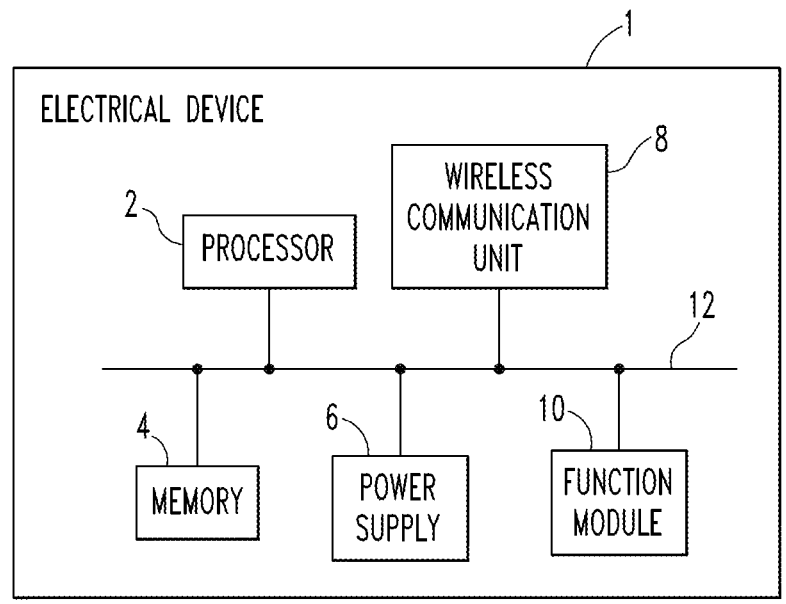
FIG. 1 is a schematic diagram of an electrical device in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "turn on", such as "turn on an electrical device" shall mean that the electrical device will provide power to another device or devices, similar to turning on a switch. As employed herein, the term "turn off", such as "turn off an electrical device" shall mean that the electrical device will stop providing power to another device or devices, similar to turning off a switch.

FIG. 1 is a schematic diagram of an electrical device 1 in accordance with an example embodiment of the disclosed concept. The electrical device includes a processor 2, a memory 4, a power supply 6, a wireless communication unit 8 and a function module 10.

The processor 2 may be, for example and without limitation, a microprocessor, a microcontroller, or some other suitable processing device or circuitry. The memory 4 may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory.

The power supply 6 provides power to operate the components of the electrical device 1. In some example embodiments of the disclosed concept, the power supply 6 may be, for example and without limitation, a self-contained power supply such as, without limitation, a battery or another suitable self-contained power supply. In some example embodiments of the disclosed concept, the power supply 6 may receive external power, such as utility power, and provide it to the components of the electrical device 1. The power supply 6 may convert the external power (e.g., without limitation, alternating current to direct current conversion, level shifting, etc.) for use by the electrical device.

The wireless communication unit 8 is structured to wirelessly communicate with other electrical devices. The wireless communication unit 8 may wirelessly communicate using any suitable communication protocol such as, for example and without limitation, cellular, wi-fi, Bluetooth, Zigbee, Z-wave or any other suitable wireless communication protocol.

The function module 10 is a module that provides a function associated with a type of the electrical device 1 (e.g., without limitation, switch, sensor, timer, etc.). The function module 10 may include physical and/or electrical elements that are associated with the function it provides. The function module 10 may differ between different types of electrical devices 1, some of which will be described in more detail with respect to FIGS. 2-5.

The electrical device 1 further includes a bus 12. The bus 12 may carry electrical signals between components of the electrical device 1. The electrical signals may be, without limitation, communication signals or power.

The electrical device 1 has a number of settings associated with its type. For example and without limitation, when the type of the electrical device 1 is a switch, the settings associated with the electrical device may include, without limitation, a schedule to turn on and turn off the switch. The electrical device 1 is configured to wirelessly receive settings information from an external device via the wireless communication unit 8. The settings information is information that indicates how particular settings associated with the electrical device 1 are to be configured. The processor 2 is structured to configure the settings associated with the electrical device 1 based on the received settings information.

By receiving the settings information wirelessly, physical controls for adjusting the settings associated with the electrical device 1 do not need to be included on the electrical device 1. For example, the electrical device 1 would not need knobs, switches, sliders, or other elements in order to configure the settings associated with it.

Figure 2:
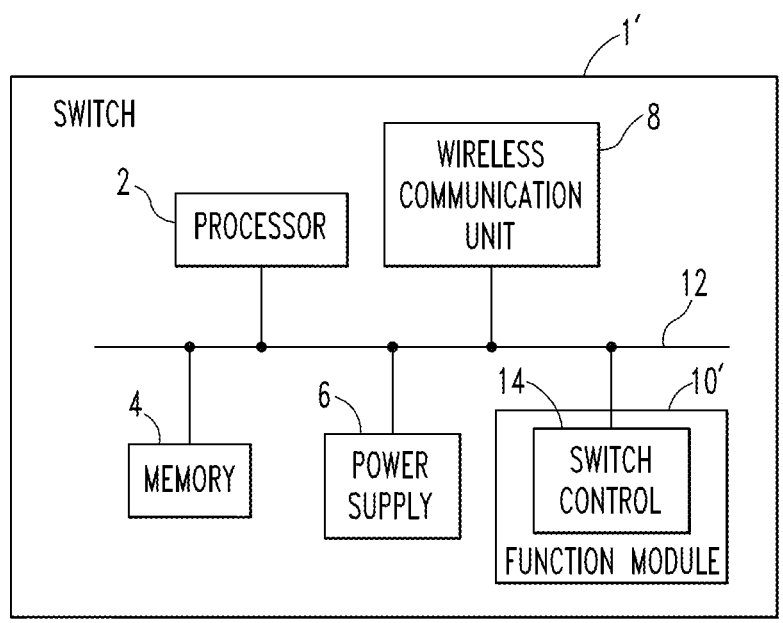
FIG. 2 is a schematic diagram of a switch type electrical device in accordance with an example embodiment of the disclosed concept.

Referring to FIG. 2, an example embodiment of the electrical device 1 of FIG. 1 is shown. In FIG. 2, the type of the electrical device 1 is a switch 1'. The switch 1' provides the function of turning on to allow power to flow to, for example and without limitation, another device (not shown), or turning off to prevent power from flowing to the other device. The switch 1' includes a processor 2, a memory 4, a power supply 6, a wireless communication unit 8 and a bus 12 similar to the electrical device 1 of FIG. 1. However, the switch 1' includes a function module 10' that provides functionality associated with a switch.

The function module 10' includes a switch control unit 14. The switch control unit 14 is a combination of a physical element (e.g., without limitation, a button, a flip switch, a knob, etc.) that a user may actuate to turn the switch 1' on or off and electrical circuitry (e.g., without limitation, a transistor) that may be electrically controlled to turn the switch 1' on or off. The switch control unit 14 is electrically connected to the bus 12 and may be electrically controlled by the processor 2.

The switch 1' has a number of settings associated with it. In some example embodiments of the disclosed concept, the switch 1' has a schedule setting. The schedule setting allows a user to set a schedule to turn on and turn off the switch 1'. The user may configure the schedule setting with the external device and then transmit it to the switch 1' as settings information. The wireless communication unit 8 of the switch 1' is structured to receive the settings information from the external device and the processor 2 is structured to configure the schedule setting of the switch 1' based on the received settings information. The processor 2 will then electrically control the switch control unit 14 to turn on and turn off the switch 1' based on the configured schedule setting. Although the schedule setting is disclosed as a setting associated with an example embodiment of the switch 1', it will be appreciated by those having ordinary skill in the art that embodiments of the switch 1' may have other settings associated with them without departing from the scope of the disclosed concept.

Figure 3:
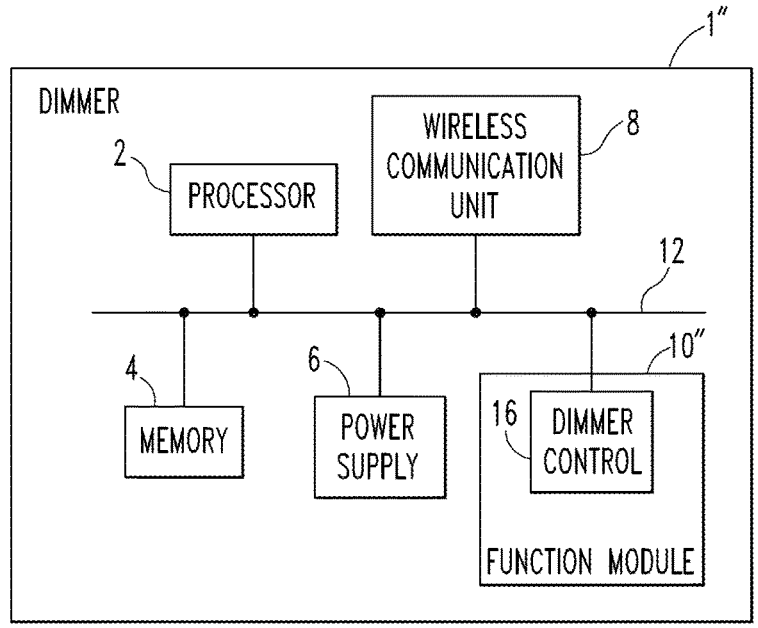
FIG. 3 is a schematic diagram of a dimmer type electrical device in accordance with an example embodiment of the disclosed concept.

Referring to FIG. 3, an example embodiment of the electrical device 1 of FIG. 1 is shown. In FIG. 3, the type of the electrical device 1 is a dimmer 1". The dimmer 1" provides the function of turning on to allow power to flow to, for example and without limitation, another device (not shown), or turning off to prevent power from flowing to the other device. The dimmer 1" additionally provides the function of controllably regulating the amount of power flowing to the other device which, when the other device is a light, causes the light to shine less brightly compared to when full power is flowing to it. The dimmer 1" includes a processor 2, a memory 4, a power supply 6, a wireless communication unit 8 and a bus 12 similar to the electrical device 1 of FIG. 1. However, the dimmer 1" includes a function module 10" that provides functionality associated with a dimmer.

The function module 10" includes a dimmer control unit 16. The dimmer control unit 16 is a combination of a physical element (e.g., without limitation, a slider, a knob, etc.) that a user may both actuate to turn the dimmer 1" on or off and to control the amount of power that is permitted to flow to the other device. The dimmer control unit 16 also includes electrical circuitry that may be electrically controlled to turn the dimmer 1" on or off and to regulate the amount of power flowing to the other device. The dimmer control unit 16 is electrically connected to the bus 12 and may be electrically controlled by the processor 2.

The dimmer 1" has a number of settings associated with it. In some example embodiments of the disclosed concept, the dimmer 1" has a ramp rate setting. The ramp rate setting allows a user to change the ramp rate of the dimmer 1". The ramp rate is how fast the dimmer 1" will fully turn on or fully turn off the other device. For example and without limitation, when the ramp rate is one second, in response to a user actuating the physical element to turn on the dimmer 1", the dimmer 1" will regulate the amount of power provided to the device to ramp up to full power over a period of one second. The user may configure the ramp rate setting with the external device and then transmit it to the dimmer 1" as settings information. The wireless communication unit 8 of the dimmer 1" is structured to receive the settings information from the external device and the processor 2 is structured to configure the schedule setting of the dimmer 1" based on the received settings information. The processor 2 will then electrically control the dimmer control unit 16 to turn the dimmer 1" on or turn off and to regulate the power flowing to the other device based on the configured ramp rate setting. Although the ramp rate setting is disclosed as a setting associated with an example embodiment of the dimmer 1", it will be appreciated by those having ordinary skill in the art that embodiments of the dimmer 1" may have other settings (e.g., without limitation, a schedule setting) associated with them without departing from the scope of the disclosed concept.

Figure 4:
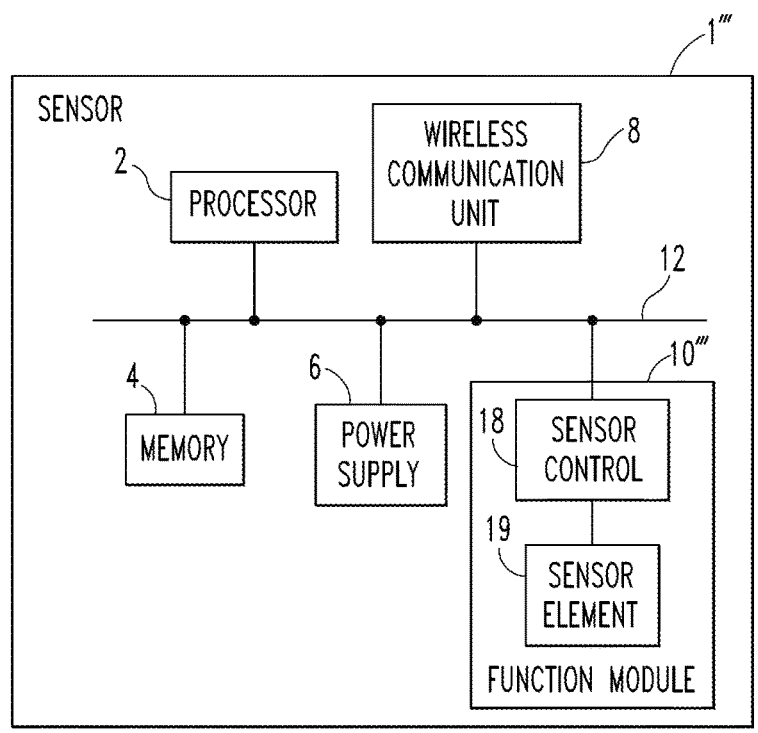
FIG. 4 is a schematic of a sensor type electrical device in accordance with an example embodiment of the disclosed concept.

Referring to FIG. 4, an example embodiment of the electrical device 1 of FIG. 1 is shown. In FIG. 4, the type of the electrical device 1 is a sensor 1'". The sensor 1" provides the function of sensing a condition (e.g., without limitation, motion, lack of motion for a predetermined time, light, lack of light, a predetermined temperature, etc.) and, in response, turning on to allow power to flow to, for example and without limitation, another device (not shown), or turning off to prevent power from flowing to the other device. In some example embodiments of the disclosed concept, the sensor 1" senses motion. However, it will be appreciated by those having ordinary skill in the art that the embodiments of the sensor 1" that sense temperature, light or any other element may be employed without departing from the scope of the disclosed concept. The sensor 1'" includes a processor 2, a memory 4, a power supply 6, a wireless communication unit 8 and a bus 12 similar to the electrical device 1 of FIG. 1. However, the sensor 1'" includes a function module 10'" that provides functionality associated with a sensor.

The function module 10'" includes a sensor control unit 18 and a sensor element 19. The sensor control unit 18 includes electrical circuitry that turns on and turns off the sensor 1'" when the condition is sensed. The sensor element 19 senses the element the sensor 1'" is associated with (e.g., without limitation, motion, temperature, light, etc.).

The sensor 1'" has a number of settings associated with it. In some example embodiments of the disclosed concept, the sensor 1'" has a condition setting. The condition setting is the condition that will cause the sensor 1'" to turn on or turn off. For example and without limitation, the condition setting may include sensed parameters that will cause the sensor 1'" to turn on or turn off (e.g., without limitation, the sensor 1'" may turn on upon detecting motion and may turn off after a predetermined period of time when no motion is detected). A user may configure the condition setting with the external device and then transmit it to the sensor 1'" as settings information. The wireless communication unit 8 of the sensor 1'" is structured to receive the settings information from the external device and the processor 2 is structured to configure the condition setting of the sensor 1" based on the received settings information. The processor 2 will then electrically control the sensor control unit 18 to turn the sensor 1'" on or turn off based on the configured condition setting. Although the condition setting is disclosed as a setting associated with an example embodiment of the sensor 1'", it will be appreciated by those having ordinary skill in the art that embodiments of the sensor 1'" may have other settings (e.g., without limitation, fixed time settings (delays before the sensor 1'" turns on or off), a sensitivity setting, a time interval setting or an ambient light level setting) associated with them without departing from the scope of the disclosed concept.

Figure 5:
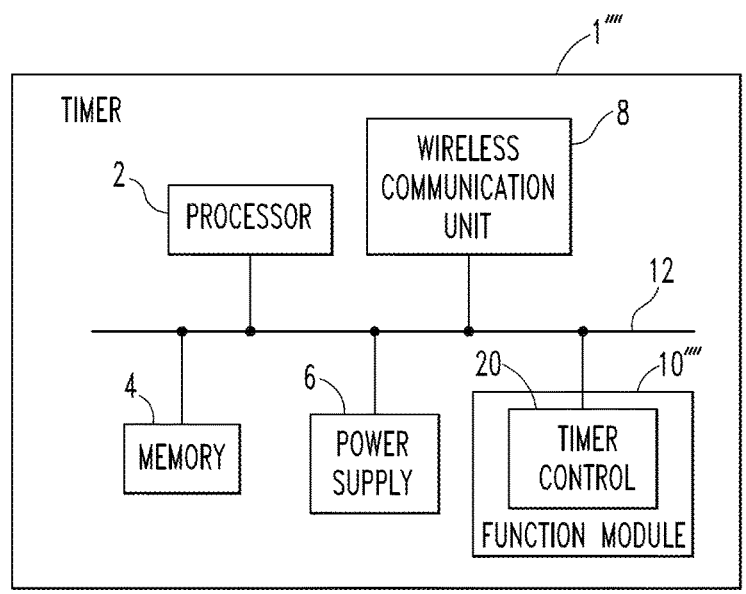
FIG. 5 is a schematic diagram of a timer type electrical device in accordance with an example embodiment of the disclosed concept.

Referring to FIG. 5, an example embodiment of the electrical device 1 of FIG. 1 is shown. In FIG. 5, the type of the electrical device 1 is a timer 1"". The timer 1"" provides the function of turning on to allow power to flow to, for example and without limitation, another device (not shown), or turning off to prevent power from flowing to the other device based on a timer setting. In some example embodiments of the disclosed concept the timer 1"" provides the function of an astronomical timer. Astronomical timers turn on and turn off based on sunrise and sunset times. However, it will be appreciated that other types of timers may be employed without departing from the scope of the disclosed concept. The timer 1"" includes a processor 2, a memory 4, a power supply 6, a wireless communication unit 8 and a bus 12 similar to the electrical device 1 of FIG. 1. However, the timer 1"" includes a function module 10"" that provides functionality associated with a timer.

The function module 10"" includes a timer control unit 20. The timer control unit 20 includes electrical circuitry that turns on and turns off the timer 1"" when based on the timer setting. The timer control unit 20 may be electrically controlled by the processor 2. For example and without limitation, the processor 2 may control the timer control unit 20 to turn on or turn off based on the timer setting.

The timer 1"" has a number of settings associated with it. One of the settings associated with the timer 1"" is the timer setting. The timer setting includes the times in which the timer 1"" should be turned on and the times in which the timer 1"" should be turned off. For example and without limitation, the timer setting may indicate which hours of which days the timer 1"" should be turned on or turned off. The timer setting may also be based on sunrise and sunset times. A user may configure the timer setting with the external device and then transmit it to the timer 1"" as settings information. In the case that the timer setting is based on sunrise and sunset times, the user may also use the external device to determine and set latitude and longitude values to accurately gather accurate sunrise and sunset times. The wireless communication unit 8 of the timer 1"" is structured to receive the settings information from the external device and the processor 2 is structured to configure the timer setting of the timer 1"" based on the received settings information. The processor 2 will then electrically control the timer control unit 20 to turn the timer 1"" on or turn off based on the configured timer setting. Although the timer setting is disclosed as a setting associated with an example embodiment of the timer 1"", it will be appreciated by those having ordinary skill in the art that embodiments of the timer 1"" may have other settings associated with them (e.g., without limitation, a time delay setting, a daylight savings enable setting or a different time out value associated with each button) without departing from the scope of the disclosed concept.

Although the switch 1', the dimmer 1", the sensor 1'" and the timer 1"" have been disclosed as example embodiments of types of the electrical device 1, it will be appreciated by those having ordinary skill in the art that other types of electrical devices may be employed without departing from the scope of the disclosed concept. For example and without limitation, in some example embodiments of the disclosed concept, the type of the electrical device is a receptacle.

In addition to the settings described above with respect to the switch 1', the dimmer 1", the sensor 1''' and the timer 1'''', in some example embodiments of the disclosed concept, the switch 1', the dimmer 1", the sensor 1''', the timer 1'''' or any other electrical device 1 according to the disclosed concept are structured to receive information such as, without limitation, time information, date information or schedule information. Furthermore, the switch 1', the dimmer 1", the sensor 1''', the timer 1'''' or any other electrical device 1 according to some example embodiments of the disclosed concept are structured to have capability of learning (e.g., without limitation, learning a user's pattern of turning on or turning off the device) or an home/away functionality (e.g., without limitation, turning on and off to imitate the pattern of a person being home and away based on the time of day or the pattern of the user's activity).

Figure 6:
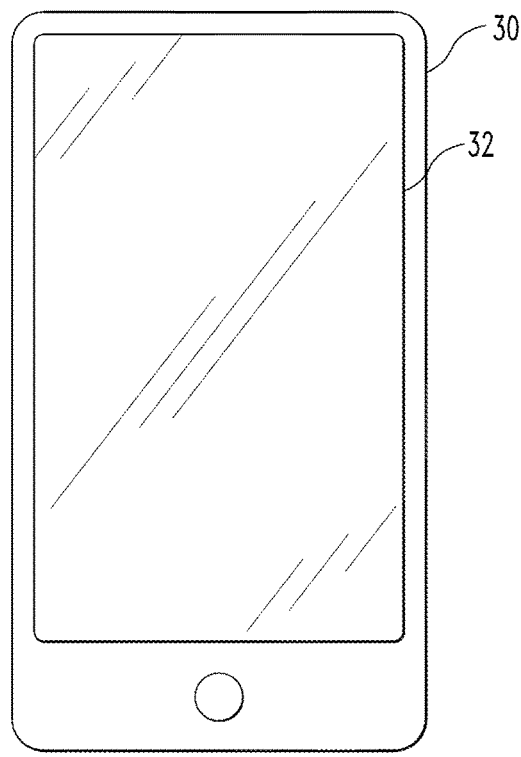
FIG. 6 is a front view of a user device in accordance with an example embodiment of the disclosed concept.

FIG. 6 is a front view of a user device 30 in accordance with an example embodiment of the disclosed concept and FIG. 7 is a schematic diagram of a system including the user device 30 of FIG. 6 in wireless communication with the electrical device 1 of FIG. 1. The user device 30 may be employed as the external device from which the electrical device 1 of FIG. 1 wirelessly receives the settings information. Although the user device 30 is illustrated in use with the electrical device 1, it will be appreciated the user device 30 may also be employed in use with the switch 1', the dimmer 1", the sensor 1''' or the timer 1'''' of FIGS. 2-5 without departing from the scope of the disclosed concept. The user device 30 is an electronic device such as, without limitation, a smart phone, a tablet or a computer. The user device 30 is structured to wirelessly transmit settings information to the electrical device 1. The user device 30 may wirelessly transmit the settings information to the electrical device 1 using any suitable communication protocol such as, for example and without limitation, cellular, wi-fi, Bluetooth, Zigbee, Z-wave or any other suitable wireless communication protocol.

The user device 30 is also structured to allow a user to configure the settings information before wirelessly transmitting it to the electrical device 1. The user device 30 may include an application, or other software, that provides an interface for the user to configure the settings information. The user device 30 may include an input unit, such as a touch screen display 32, that allows the user to configure the settings information. By configuring the settings information with the user device 30 and then wirelessly transmitting it to the electrical device 1, controls for configuring the settings information do not need to be included in the electrical device 1. Without such controls, it is easier to design an aesthetically pleasing electrical device 1. Additionally, more complex settings may be used in the electrical device.

FIG. 8 is a flowchart of a method of transmitting settings information in accordance with an example embodiment of the disclosed concept. The method of FIG. 8 may be implemented, for example and without limitation, in the user device 30 of FIGS. 6 and 7. At 40, the user device 30 displays an interface that allows a user to configure settings associated with an electrical device 1. The interface may be included as part of an application executed by the user device 30. At 42, the user device 30 receives input from the user to configure the settings associated with the electrical device 1. The input may be received through, for example and without limitation, the touch screen display 32. At 44, the user device 30 generates settings information based on the configuration of settings provided by the user. At 46, the user device 30 wirelessly transmits the settings information to the electrical device 1. The electrical device 1 may then use the settings information to configure the settings associated with the electrical device 1. FIG. 9 is a flowchart of a method of receiving settings information in accordance with an example embodiment of the disclosed concept. The method of FIG. 9 may be implements, for example and without limitation, in the electrical device 1 of FIG. 1 or the switch 1', the dimmer 1", the sensor 1''' or the timer 1'''' of FIGS. 2-5. At 50, the electrical device 1 establishes communication with the user device 30 via the wireless communication unit 8. At 52, the electrical device 1 receives settings information via a wireless communication from the user device 30. The setting information includes information to configure one or more settings associated with the electrical device 1. At 54, the electrical device 1 configures its settings based on the settings information received from the user device 30.

The disclosed concept can also be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical device having one or more settings associated therewith, the electrical device comprising:
    a wireless communication unit structured to wirelessly communicate with an external device and to wirelessly receive settings information from the external device;
    a processor structured to configure one or more settings associated with the electrical device based on the received settings information; and
    a function module structured to provide an additional function associated with a type of the electrical device,
    wherein the type of the electrical device is a switch; and
        wherein the one or more settings associated with the electrical device include a schedule setting,
    wherein the function module includes a switch control unit including a physical element actuatable by a user, and
    wherein the switch control unit is structured to turn on or turn of the electrical device in response to a user actuating the physical element or under control of the processor.

2. An electrical device having one or more settings associated therewith, the electrical device comprising:
    a wireless communication unit structured to wirelessly communicate with an external device and to wirelessly receive settings information from the external device;
    a processor structured to configure one or more settings associated with the electrical device based on the received settings information; and a function module structured to provide an additional function associated with a type of the electrical device,
wherein the type of the electrical device is a dimmer; and
wherein the one or more settings associated with the electrical device include at least one of a schedule setting and a ramp rate setting.

3. The electrical device of claim 2, wherein the function module includes a dimmer control unit including a physical element actuatable by a user; and wherein the dimmer control unit is structured to turn on or turn off the electrical device or regulate an amount of power provide to another device based on a user actuating the physical element or under control of the processor.

4. An electrical device having one or more settings associated therewith, the electrical device comprising:
a wireless communication unit structured to wirelessly communicate with an external device and to wirelessly receive settings information from the external device;
a processor structured to configure one or more settings associated with the electrical device based on the received settings information; and
a function module structured to provide an additional function associated with a type of the electrical device,
wherein the type of the electrical device is a sensor,
wherein the one or more settings associated with the electrical device include at least one of a condition setting, a fixed time setting and a sensitivity setting, and
wherein the type of the electrical device is at least one of a motion sensor, a light sensor and a temperature sensor.

5. The electrical device of claim 4, wherein the function module is structured to sense a condition and includes a sensor control unit; wherein the sensor control unit is structured to turn on or turn off the electrical device in response to sensing the condition.

6. An electrical device having one or more settings associated therewith, the electrical device comprising:
a wireless communication unit structured to wirelessly communicate with an external device and to wirelessly receive settings information from the external device;
a processor structured to configure one or more settings associated with the electrical device based on the received settings information; and
a function module structured to provide an additional function associated with a type of the electrical device,
wherein the type of the electrical device is a timer; and
wherein the one or more settings associated with the electrical device includes a timer setting.

7. The electrical device of claim 6, wherein the function module includes a timer control unit; and wherein the timer control unit is structured to turn on or turn off the electrical device under control of the processor.

8. The electrical device of claim 6, wherein the type of the electrical device is an astronomical timer; and wherein the timer setting includes information to turn on or turn off the electrical device based on sunrise and sunset times.

9. The electrical device of claim 1, wherein the wireless communication unit is structured to wirelessly communicate with the external device using at least one of a cellular, wi-fi, Bluetooth, Zigbee and Z-wave protocol.

10. A system comprising:
a user device structured to wirelessly transmit settings information including information for configuring one or more settings; and
an electrical device including:
a wireless communication unit structured to wirelessly communicate with the user device and to wirelessly receive the settings information from the external device;
a processor structured to configure one or more settings associated with the electrical device based on the received settings information; and
a function module structured to provide an additional function associated with a type of the electrical device,
wherein the type of the electrical device is a dimmer; and
wherein the one or more settings associated with the electrical device include at least one of a schedule setting and a ramp rate setting.

11. The system of claim 10, wherein the user device is structured to receive user input related to configuration of one or more settings and to generate the settings information based on the user input.

12. The system of claim 10, wherein the user device is at least one of a smartphone, a tablet and a computer.

13. The system of claim 10, wherein the user device is structured to wirelessly transmit the settings information using at least one of a cellular, wi-fi, Bluetooth, Zigbee and Z-wave protocol.

14. A system comprising:
a user device structured to wirelessly transmit settings information including information for configuring one or more settings; and
an electrical device including:
a wireless communication unit structured to wirelessly communicate with the user device and to wirelessly receive the settings information from the external device;
a processor structured to configure one or more settings associated with the electrical device based on the received settings information; and
a function module structured to provide an additional function associated with a type of the electrical device,
wherein the type of the electrical device is a timer; and
wherein the one or more settings associated with the electrical device includes a timer setting.

* * * * *